United States Patent
He

(10) Patent No.: US 12,388,893 B2
(45) Date of Patent: Aug. 12, 2025

(54) P2P-BASED DATA DISTRIBUTION METHOD, APPARATUS, AND SYSTEM

(71) Applicant: HUAWEI TECHNOLOGIES CO., LTD., Guangdong (CN)

(72) Inventor: Gangjie He, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 251 days.

(21) Appl. No.: 18/251,103

(22) PCT Filed: Sep. 7, 2021

(86) PCT No.: PCT/CN2021/116866
§ 371 (c)(1),
(2) Date: Apr. 28, 2023

(87) PCT Pub. No.: WO2022/089008
PCT Pub. Date: May 5, 2022

(65) Prior Publication Data
US 2023/0421635 A1  Dec. 28, 2023

(30) Foreign Application Priority Data
Oct. 31, 2020 (CN) .......................... 202011197223.3

(51) Int. Cl.
*H04L 67/1061* (2022.01)
*H04L 45/44* (2022.01)
(Continued)

(52) U.S. Cl.
CPC .......... *H04L 67/1063* (2013.01); *H04L 45/44* (2013.01); *H04L 67/104* (2013.01); *H04L 67/1074* (2013.01)

(58) Field of Classification Search
None
See application file for complete search history.

(56) References Cited

U.S. PATENT DOCUMENTS 8,270,313 B2 *  9/2012  Tao ........................ H04W 40/22
                                                            370/252
9,344,256 B2 *  5/2016  Thubert .................. H04L 45/42
(Continued)

FOREIGN PATENT DOCUMENTS

CN       1988468 A    6/2007
CN     101505285 A    8/2009

*Primary Examiner* — Lashonda Jacobs-Burton
(74) *Attorney, Agent, or Firm* — WOMBLE BOND DICKINSON (US) LLP

(57) ABSTRACT

This application provides a P2P-based data distribution method, apparatus, and system. The method is applied to a data distribution system, where the data distribution system includes at least three devices and a server. The method includes: Any one of the at least three devices sends request information to the server, and receives response information sent by the server. The any device determines a first target device set from adjacent devices based on the response information, and sends first data to a device in the first target device set, where the first data carries identification information of the any device, and the identification information is used to indicate the device in the first target device set to distribute the first data to a device in a second target device set when determining the first data as to-be-distributed data.

20 Claims, 5 Drawing Sheets

(51) Int. Cl.
*H04L 67/104* (2022.01)
*H04L 67/1074* (2022.01)

(56) References Cited

U.S. PATENT DOCUMENTS

| | | |
|---|---|---|
| 9,491,051 B2 | 11/2016 | Hui et al. |
| 10,609,621 B2 * | 3/2020 | Yang ................. H04L 45/48 |
| 2016/0035185 A1 * | 2/2016 | Barrs ................. G07F 17/3283 |
| | | 463/28 |
| 2022/0179911 A1 * | 6/2022 | Caudy ................. G06F 3/0481 |
| 2025/0045304 A1 * | 2/2025 | Quatro ................. G06N 20/00 |

* cited by examiner

P2P-BASED DATA DISTRIBUTION METHOD, APPARATUS, AND SYSTEM

CROSS-REFERENCE TO RELATED APPLICATIONS

This application is a national stage of International Application No PCT/CN2021/116866, filed on Sep. 7, 2021, which claims priority to Chinese Patent Application No. 202011197223.3, filed on Oct. 31, 2020. Both of the aforementioned applications are hereby incorporated by reference in their entireties.

TECHNICAL FIELD

This application relates to the field of terminal technologies, and in particular, to a P2P-based data distribution method, apparatus, and system.

BACKGROUND

In the field of computer networks, mainstream communication modes are classified into two types: a client/server (C/S) mode and a peer-to-peer (P2P) mode. In the P2P communication mode, devices can directly communicate with each other to implement resource sharing and information exchange. This provides great convenience for communication between users. In a multi-party communication scenario based on the P2P communication mode, for example, a group chat or an audio/video conference, each device may send communication data, for example, a message or an audio/video stream, of the device to all other devices based on a P2P channel established between the devices. A current IPv4 network environment has a problem of network address shortage. Therefore, a network address translation (NAT) device is required to translate a private internet protocol (IP) address of an internal network into a public IP address of an external network. Although the NAT device resolves the problem of network address shortage, communication between devices becomes difficult in different internal networks. In most multi-party communication scenarios, a P2P channel cannot be established between every two devices.

FIG. 1 is a schematic diagram of a principle of an existing P2P-based data distribution method, and a typical scenario is provided. A P2P channel is established only between some devices. During multi-party communication, each device may send communication data of the device to all other devices. For example, a device A101 may send same communication data to a device B102, a device C103, a device D104, a device E105, and a device F106, where the data sent to the device D104 and the device F106 may pass through a P2P channel A-C. As a result, a data volume of the P2P channel A-C is multiplied, and the P2P channel A-C becomes a bottleneck of data communication. This may cause network congestion. In addition, the same communication data is transmitted on the same P2P channel for a plurality of times, also causing a waste of network resources.

It can be learned that, in the existing P2P-based data distribution method, the same communication data is transmitted on the same P2P channel for a plurality of times, and the network congestion and the waste of network resources exist.

SUMMARY

Embodiments of this application provide a P2P channel-based data distribution method, apparatus, and system, to resolve a problem of network congestion and a waste of network resources in a multi-party communication scenario, caused by repeated transmission of same communication data on a same P2P channel without considering a bottleneck problem of some P2P channels in the conventional technology.

According to a first aspect, this application provides a P2P channel-based data distribution method, applied to a data distribution system, where the data distribution system includes at least three devices and a server, and the method includes: Any one of the at least three devices sends request information to the server, and receives response information sent by the server, where the request information is used to request to acquire related information of an adjacent device of the any device, the adjacent device is connected to the any device via a P2P channel, and the response information carries the related information determined based on a pre-generated acyclic graph of a data distribution path; and the any device determines a first target device set from the adjacent device based on the response information, and sends first data to a device in the first target device set, where the first data carries identification information of the any device, the identification information is used to indicate the device in the first target device set to distribute the first data to a device in a second target device set when determining the first data as to-be-distributed data, the device in the first target device set is a next-hop device of the any device, the device in the second target device set is a next-hop device of the device in the first target device set, and the to-be-distributed data is data that is to be distributed to all devices in the data distribution system.

According to the foregoing design, a source device in the data distribution system may receive the response information from the server, where the response information carries related information that is of an adjacent device of the source device and that is determined by the server based on the pre-generated acyclic graph of the data distribution path, so that the source device may determine a next-hop device of the source device based on the response information, and send, to the next-hop device of the source device, to-be-distributed data that is to be distributed to all devices in the data distribution system. The next-hop device of the source device performs secondary distribution on the to-be-distributed data, thereby avoiding a problem of network congestion and a waste of network resources caused by repeated transmission of same communication data on a same P2P channel.

In a possible design, before the sending request information to the server, the method further includes: Each of the at least three devices sends first information and second information to the server, where the first information and the second information are used to indicate the server to generate the acyclic graph of the data distribution path, the first information carries the identification information of the any device and identification information of the adjacent device connected to the any device via the P2P channel, and the second information carries quality of service QoS of the P2P channel.

In a possible design, the method further includes: Each of the at least three devices periodically sends updated second information to the server, where the updated second information is used to indicate the server to update the acyclic graph of the data distribution path.

In a possible design, the method further includes: Any one of the at least three devices sends subscription request information to the server, and receives subscription update information sent by the server after the acyclic graph of the data distribution path is updated, where the subscription request information is used to request to subscribe to the acyclic graph of the data distribution path or third information, the third information is identification information of an adjacent device of the device sending the subscription request information, and the subscription update information carries an updated acyclic graph of the data distribution path or the third information determined based on an updated acyclic graph of the data distribution path.

According to the foregoing design, the devices in the data distribution system may send the first information and the second information to the server, and periodically send the updated second information to the server, so that the server may generate the acyclic graph of the data distribution path based on the first information and the second information, and periodically update the acyclic graph of the data distribution path based on the periodically sent updated second information. In this way, any device in the data distribution system may determine a next-hop device of the any device based on the acyclic graph of the data distribution path generated by the server, and send, to the next-hop device of the any device, the to-be-distributed data that is to be distributed to all devices in the data distribution system. After the server updates the acyclic graph of the data distribution path, a device in the data distribution system may synchronously update the acyclic graph of the data distribution path, to prevent the device from sending data to an incorrect next-hop device of the device.

In a possible design, the sending request information to the server, and receiving response information sent by the server includes: sending first query request information to the server, and receiving first query response information sent by the server, where the first query request information is used to request to query fourth information, the fourth information is identification information of the adjacent device of the any device, and the first query response information carries the fourth information determined based on the acyclic graph of the data distribution path; or sending first subscription request information to the server, and receiving first subscription response information sent by the server, where the first subscription request information is used to request to subscribe to the acyclic graph of the data distribution path or fourth information, and the first subscription response information carries the acyclic graph of the data distribution path or the fourth information determined based on the acyclic graph of the data distribution path.

According to the foregoing design, the source device in the data distribution system may send, to the server, request information used to request to acquire the related information of the adjacent device of the source device, and receive the response information sent by the server, where the response information carries the related information determined based on the pre-generated acyclic graph of the data distribution path, so that the source device may determine the next-hop device of the source device based on the response information.

In a possible design, the method further includes: when receiving the first data, any one of the at least three devices determines, based on a number identifier of the first data, whether the first data is repeated data; and if the first data is the repeated data, the any device discards the first data; or if the first data is not the repeated data, the any device determines whether the first data is the to-be-distributed data.

In a possible design, the determining whether the first data is the to-be-distributed data includes: determining, based on a service identifier of a P2P channel for transmitting the first data or a service identifier of the first data, whether the first data is the to-be-distributed data.

According to the foregoing design, the device in the first target device set may determine, based on the number identifier of the first data, whether the first data is the repeated data, determine, based on the service identifier of the first data or the service identifier of the P2P channel for transmitting the first data, whether the first data is the to-be-distributed data, and discard the first data when determining the first data as the repeated data, to avoid secondary distribution of the repeated data and a waste of network resources.

In a possible design, the distributing the first data to a device in a second target device set includes: sending second query request information to the server periodically or when a buffer storing the to-be-distributed data overflows, where the second query request information is used to request to query fifth information, and the fifth information is the identification information of the adjacent device of the any device; receiving, by the any device, second query response information sent by the server, where the second query response information carries the fifth information determined based on the acyclic graph of the data distribution path; and determining, by the device in the first target device set, the second target device set based on the second query response information, and distributing the first data to the device in the second target device set.

According to the foregoing design, when determining the first data as the to-be-distributed data, the device in the first target device set may send the second query request information to the server periodically or when the buffer storing the to-be-distributed data overflows, to reduce a quantity of times of transmission of query request information by the device to the server, and reduce a communication delay. After sending the second query request information to the server, the device receives the second query response information sent by the server, and determines the next-hop device of the device from adjacent devices based on the second query response information, so that the device may send the first data to the next-hop device of the device when determining the first data as the to-be-distributed data, to implement secondary distribution of the data, and avoid a problem of network congestion and a waste of network resources caused by repeated transmission of same communication data on a same P2P channel.

In a possible design, the distributing the first data to a device in a second target device set further includes: when it is determined that there is no acyclic graph of the data distribution path or fifth information, sending second subscription request information to the server, and receiving second subscription response information sent by the server, where the fifth information is the identification information of the adjacent device of the any device, the second subscription request information is used to request to subscribe to the acyclic graph of the data distribution path or the fifth information determined based on the acyclic graph of the data distribution path, and the second subscription response information carries the acyclic graph of the data distribution path or the fifth information determined based on the acyclic graph of the data distribution path; and determining, by the any device, the second target device set based on the second subscription response information, and distributing the first data to the device in the second target device set.

According to the foregoing design, when determining that there is no acyclic graph of the data distribution path or fifth information locally, the device in the first target device set sends the second subscription request information to the server, receives the second subscription response information sent by the server, and determines the next-hop device of the device from the adjacent devices based on the second subscription response information, so that the device may send the first data to the next-hop device of the device when determining the first data as the to-be-distributed data, to implement secondary distribution of the data, and avoid a problem of network congestion and a waste of network resources caused by repeated transmission of same communication data on a same P2P channel.

In a possible design, the distributing the first data to a device in a second target device set further includes: when it is determined that the first data carries the acyclic graph of the data distribution path, determining the second target device set based on the acyclic graph of the data distribution path, and distributing the first data to the device in the second target device set.

According to the foregoing design, the source device may add the acyclic graph of the data distribution path to the first data and send the first data to the device in the first target device set, so that when determining that the first data carries the acyclic graph of the data distribution path, the device in the first target device set directly determines the next-hop device of the device from the adjacent devices based on the acyclic graph of the data distribution path, and when determining the first data as the to-be-distributed data, the device may send the first data to the next-hop device of the device, to implement secondary distribution of the data, and avoid a problem of network congestion and a waste of network resources caused by repeated transmission of same communication data on a same P2P channel.

According to a second aspect, this application further provides a P2P channel-based data distribution method, applied to a data distribution system, where the data distribution system includes at least three devices and a server, and the method includes: The server receives request information sent by any one of the at least three devices, where the request information is used to request to acquire related information of an adjacent device of the any device, and the adjacent device is connected to the any device via a P2P channel; and the server sends response information to the any device, where the response information is used to indicate the any device to determine a first target device set from the adjacent device and send first data to a device in the first target device set, the response information carries the related information determined based on a pre-generated acyclic graph of a data distribution path, the device in the first target device set is a next-hop device of the any device, and the first data carries identification information of the any device.

According to the foregoing design, the server in the data distribution system may send the response information to a source device in the data distribution system, where the response information carries related information that is of an adjacent device of the source device and that is determined by the server based on the pre-generated acyclic graph of the data distribution path, so that the source device may determine a next-hop device of the source device based on the response information, and send, to the next-hop device of the source device, to-be-distributed data that is to be distributed to all devices in the data distribution system. The next-hop device of the source device performs secondary distribution on the to-be-distributed data, thereby avoiding a problem of network congestion and a waste of network resources caused by repeated transmission of same communication data on a same P2P channel.

In a possible design, before the server receives the request information sent by any one of the at least three devices, the method further includes: The server receives first information and second information that are sent by each of the at least three devices, and generates the acyclic graph of the data distribution path based on the first information and the second information, where the first information carries identification information of each device and identification information of an adjacent device connected to each device via the P2P channel, and the second information carries quality of service QoS of the P2P channel.

In a possible design, the method further includes: The server receives updated second information periodically sent by each of the at least three devices, and updates the acyclic graph of the data distribution path based on the updated second information.

In a possible design, the method further includes: after updating the acyclic graph of the data distribution path, the server sends subscription update information to a device that is of the at least three devices and that has sent subscription request information, where the subscription request information is used to request to subscribe to the acyclic graph of the data distribution path or third information, the third information is identification information of an adjacent device of the device sending the subscription request information, and the subscription update information carries an updated acyclic graph of the data distribution path or the third information determined based on an updated acyclic graph of the data distribution path.

According to the foregoing design, the server may generate the acyclic graph of the data distribution path based on the first information and the second information that are sent by the devices in the data distribution system, and periodically update the acyclic graph of the data distribution path based on the periodically sent updated second information. In this way, any device in the data distribution system may determine a next-hop device of the any device based on the acyclic graph of the data distribution path generated by the server, and send, to the next-hop device of the any device, the to-be-distributed data that is to be distributed to all devices in the data distribution system. After the server updates the acyclic graph of the data distribution path, a device in the data distribution system may synchronously update the acyclic graph of the data distribution path, to prevent the device from sending data to an incorrect next-hop device of the device.

In a possible design, that the server sends response information to the any device includes: The server receives query request information sent by any one of the at least three devices, and sends query response information to the any device, where the query request information is used to request to query fourth information, the fourth information is identification information of the adjacent device of the any device, and the query response information carries the fourth information determined based on the acyclic graph of the data distribution path; or the server receives subscription request information sent by any one of the at least three devices, and sends subscription response information to the any device, where the subscription request information is used to request to subscribe to the acyclic graph of the data distribution path or fourth information, and the subscription response information carries the acyclic graph of the data distribution path or the fourth information determined based on the acyclic graph of the data distribution path.

According to a third aspect, this application further provides a data distribution system, including at least three devices and a server.

Any one of the at least three devices is configured to: send request information to the server, and receive response information sent by the server, where the request information is used to request to acquire related information of an adjacent device of the any device, the adjacent device is connected to the any device via a P2P channel, and the response information carries the related information determined based on a pre-generated acyclic graph of a data distribution path; and the any device is further configured to: determine a first target device set from the adjacent device based on the response information, and send first data to a device in the first target device set, where the first data carries identification information of the any device, the identification information is used to indicate the device in the first target device set to distribute the first data to a device in a second target device set when determining the first data as to-be-distributed data, the device in the first target device set is a next-hop device of the any device, the first data carries the identification information of the any device, the device in the second target device set is a next-hop device of the device in the first target device set, and the to-be-distributed data is data that is to be distributed to all devices in the data distribution system. In a possible design, before the sending request information to the server, the server is configured to: receive first information and second information that are sent by each of the at least three devices, and generate the acyclic graph of the data distribution path based on the first information and the second information, where the first information carries identification information of each device and identification information of an adjacent device connected to each device via the P2P channel, and the second information carries quality of service QoS of the P2P channel.

In a possible design, the server is further configured to: receive updated second information periodically sent by each of the at least three devices, and update the acyclic graph of the data distribution path based on the updated second information.

In a possible design, the server is further configured to: after updating the acyclic graph of the data distribution path, send subscription update information to a device that is of the at least three devices and that has sent subscription request information, where the subscription request information is used to request to subscribe to the acyclic graph of the data distribution path or third information, the third information is identification information of an adjacent device of the device sending the subscription request information, and the subscription update information carries an updated acyclic graph of the data distribution path or the third information determined based on an updated acyclic graph of the data distribution path.

In a possible design, when sending the request information to the server, and receiving the response information sent by the server, the any device is configured to: send first query request information to the server, and receive first query response information sent by the server, where the first query request information is used to request to query fourth information, the fourth information is identification information of the adjacent device of the any device, and the first query response information carries the fourth information determined based on the acyclic graph of the data distribution path; or send first subscription request information to the server, and receive first subscription response information sent by the server, where the first subscription request information is used to request to subscribe to the acyclic graph of the data distribution path or fourth information, and the first subscription response information carries the acyclic graph of the data distribution path or the fourth information determined based on the acyclic graph of the data distribution path.

In a possible design, the any device is further configured to: when receiving the first data, determine, based on a number identifier of the first data, whether the first data is repeated data; and if the first data is the repeated data, discard the first data; or if the first data is not the repeated data, determine whether the first data is the to-be-distributed data.

In a possible design, when determining whether the first data is the to-be-distributed data, the any device is configured to: determine, based on a service identifier of a P2P channel for transmitting the first data or a service identifier of the first data, whether the first data is the to-be-distributed data.

In a possible design, when distributing the first data to the device in the second target device set, the any device is configured to: send second query request information to the server periodically or when a buffer storing the to-be-distributed data overflows, where the second query request information is used to request to query fifth information, and the fifth information is identification information of an adjacent device of the device in the first target device set; receive second query response information sent by the server, where the second query response information carries the fifth information determined based on the acyclic graph of the data distribution path; and determine the second target device set based on the second query response information, and distribute the first data to the device in the second target device set.

In a possible design, when distributing the first data to the device in the second target device set, the any device is configured to: when determining that there is no acyclic graph of the data distribution path or fifth information, send second subscription request information to the server, and receive second subscription response information sent by the server, where the fifth information is identification information of an adjacent device of the device in the first target device set, the second subscription request information is used to request to subscribe to the acyclic graph of the data distribution path or the fifth information determined based on the acyclic graph of the data distribution path, and the second subscription response information carries the acyclic graph of the data distribution path or the fifth information determined based on the acyclic graph of the data distribution path; and determine the second target device set based on the acyclic graph of the data distribution path, and distribute the first data to the device in the second target device set.

In a possible design, when distributing the first data to the device in the second target device set, the any device is configured to: when determining that the first data carries the acyclic graph of the data distribution path, determine the second target device set based on the acyclic graph of the data distribution path, and distribute the first data to the device in the second target device set.

According to a fourth aspect, this application further provides a P2P-based data distribution apparatus, applied to a data distribution system, where the data distribution system includes at least three devices and a server, and the apparatus includes: at least one processor and a memory. The memory stores one or more computer programs; and when the one or more computer programs stored in the memory are executed by the at least one processor, the apparatus is enabled to perform the method according to any one of the first aspect or the possible designs of the first aspect, or the method according to any one of the second aspect or the possible designs of the second aspect.

According to a fifth aspect, this application further provides a computer-readable storage medium. The computer-readable storage medium includes a computer program, and when the computer program is run on a computer, the computer is enabled to perform the method according to any one of the first aspect or the possible designs of the first aspect, or the method according to any one of the second aspect or the possible designs of the second aspect.

According to a sixth aspect, this application further provides a program product. When the program product runs on a computer, the computer is enabled to perform the method according to any one of the first aspect or the possible designs of the first aspect, or the method according to any one of the second aspect or the possible designs of the second aspect.

According to a seventh aspect, this application further provides a chip. The chip may be coupled to a memory of a first core network device, and is configured to invoke a computer program stored in the memory and perform the method according to any one of the first aspect and the possible designs of the first aspect, or the method according to any one of the second aspect or the possible designs of the second aspect.

For beneficial effects of the third aspect to the seventh aspect and the possible designs of the third aspect to the seventh aspect, refer to the descriptions of beneficial effects of the method according to any one of the first aspect and the possible designs of the first aspect or the method according to any one of the second aspect and the possible designs of the second aspect.

DESCRIPTION OF EMBODIMENTS

The following clearly describes the technical solutions in embodiments of this application with reference to the accompanying drawings in embodiments of this application.

Figure 1:
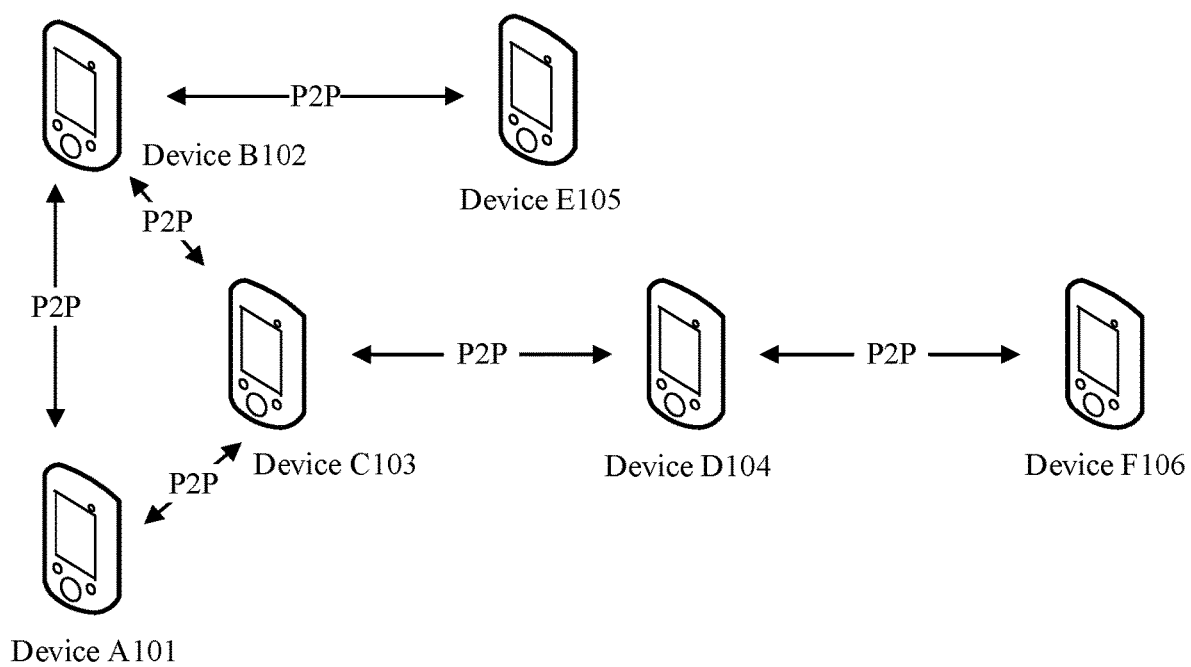
FIG. 1 is a schematic diagram of a principle of an existing P2P-based data distribution method.
Figure 2:
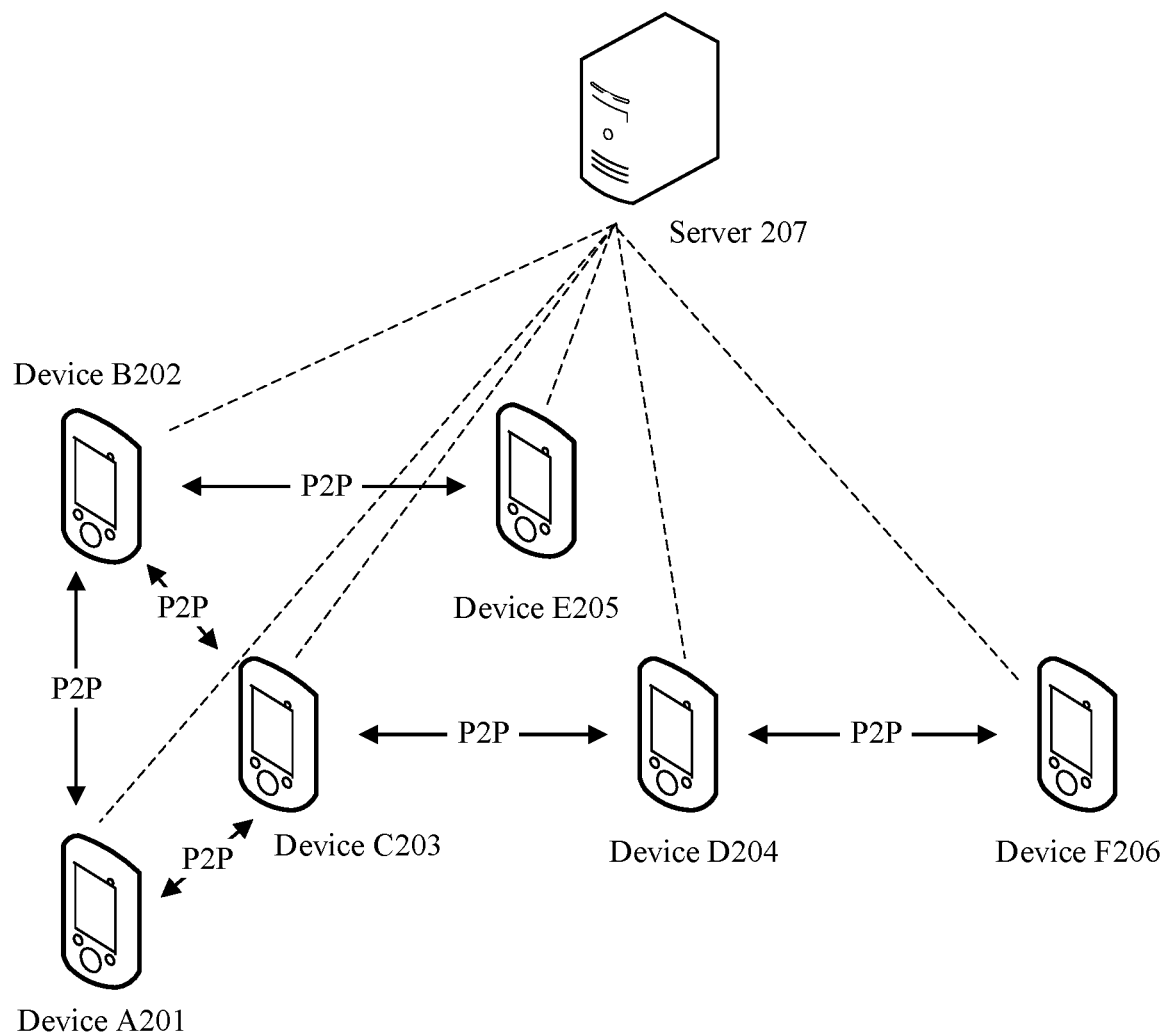
FIG. 2 is a schematic architectural diagram of a data distribution system to which an embodiment of this application is applicable.

FIG. 2 is a schematic architectural diagram of a data distribution system to which an embodiment of this application is applicable. The data distribution system includes a device A201, a device B202, a device C203, a device D204, a device E205, a device F206, and a server 207. In the data distribution system, a wireless peer to peer (P2P) channel is established between the device A201, the device B202, and the device C203, a P2P channel is established between the device B202 and the device E205, a P2P channel is established between the device C203 and the device D204, and a P2P channel is established between the device D204 and the device F206.

It should be understood that the data distribution system provided in this embodiment of this application is applicable to both a low frequency scenario and a high frequency scenario. An application scenario of the data distribution system provided in this embodiment of this application includes but is not limited to a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunications system (UMTS), and a worldwide interoperability for microwave access (WIMAX) communications system, a future 5th generation (5G) system, a new radio (NR) communications system, and the like.

It should be understood that, in this embodiment of this application, the device A201, the device B202, the device C203, the device D204, the device E205, the device F206, and the server 207 may directly communicate with each other, or may communicate with each other through forwarding by another device. This is not specifically limited in this embodiment of this application.

In this embodiment of this application, the device A201, the device B202, the device C203, the device D204, the device E205, and the device F206 each may be a device that provides voice and/or data connectivity for a user, for example, may be a handheld device with a wireless connection function or a processing device connected to a wireless modem. The device may communicate with a core network via a radio access network (RAN), and exchange voice and/or data with the RAN. The device may be user equipment (UE), a wireless terminal device, a mobile terminal device, a device-to-device (D2D) communications terminal device, a vehicle-to-everything (V2X) communications terminal device, a machine-to-machine/machine-type communications (M2M/MTC) terminal device, an Internet of Things (IoT) terminal device, a subscriber unit, a subscriber station, a mobile station, a remote station, an access point (AP), a remote terminal, an access terminal, a user terminal, a user agent, a user device, or the like. For example, the device may be a mobile phone (or referred to as a "cellular" phone), a computer with a mobile terminal device, or a portable, pocket-sized, handheld, or computer built-in mobile apparatus.

For example, the device may be a device such as a personal communication service (PCS) phone, a cordless telephone set, a session initiation protocol (SIP) phone, a wireless local loop (WLL) station, or a personal digital assistant (PDA). Alternatively, the device may be a limited device, for example, a device with relatively low power consumption, a device with a limited storage capability, or a device with a limited computing capability. For example, the device may be an information sensing device such as a bar code, radio frequency identification (RFID), a sensor, a global positioning system (GPS), or a laser scanner.

As an example instead of a limitation, in this embodiment of this application, the mentioned device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that can be directly worn on the body or integrated into clothes or an accessory of a user. The wearable device is not only a hardware device, but also implements a powerful function through software support, data exchange, and cloud interaction. In a broad sense, the wearable intelligent device includes full-featured and large-sized devices that can implement all or a part of functions without depending on smartphones, for example, smart watches or smart glasses, and includes devices that are dedicated to only one type of application function and may collaboratively work with other devices such as smartphones, for example, various smart bands, smart helmets, or smart jewelry for monitoring vital signs.

If the various devices described above are located in a vehicle, for example, placed in the vehicle or mounted in the vehicle, the devices may be considered as vehicle-mounted terminal devices, and the vehicle-mounted terminal devices are also referred to as, for example, on-board units (OBUs).

In this embodiment of this application, the server 207 may be any device having a transmitting and receiving function or a chip that may be disposed in the device.

It should be understood that, for ease of understanding, FIG. 2 schematically shows a data distribution system, but this should not constitute any limitation on this application. The data distribution system may further include more servers, or may include more devices. Servers that communicate with different devices may be a same server, or may be different servers. Quantities of servers that communicate with different devices may be the same or may be different. This is not specifically limited in this embodiment of this application.

The foregoing describes the data distribution system to which this embodiment of this application is applicable. The following describes, with reference to the accompanying drawings, a P2P-based data distribution method provided in embodiments of this application.

It should be understood that the terms "system" and "network" may be used interchangeably in embodiments of this application. "At least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" generally indicates an "or" relationship between associated objects. "At least one of the following items (objects)" or a similar expression means any combination of these items, including a single item (object) or any combination of a plurality of items (objects). For example, at least one item (object) of a, b, or c may represent a, b, c, a and b, a and c, b and c, or a, b, and c.

In addition, unless otherwise stated, ordinal numbers such as "first" and "second" in embodiments of this application are for distinguishing between a plurality of objects, but are not intended to limit an order, a time sequence, priorities, or importance of the plurality of objects. For example, a first priority criterion and a second priority criterion are merely used to distinguish between different criteria, but do not indicate different content, priorities, importance, or the like of the two criteria.

Figure 3A:
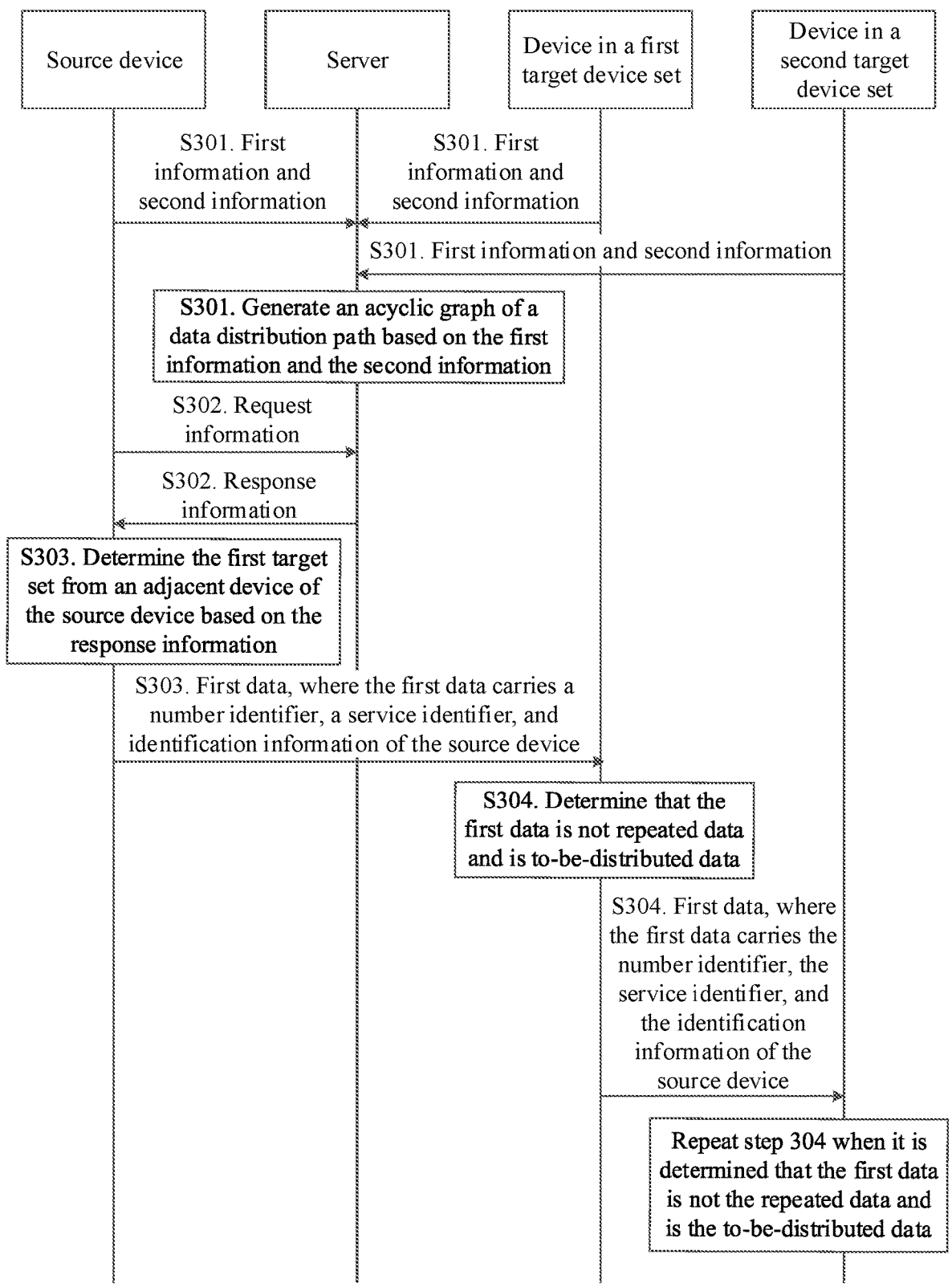
FIG. 3a is a schematic flowchart of a P2P-based data distribution method to which an embodiment of this application is applicable.

In some embodiments, FIG. 3a shows a P2P-based data distribution method according to an embodiment of this application, and the method may be applied to the data distribution system shown in FIG. 2. The method includes the following operations.

S301: Each device in the data distribution system sends first information and second information to a server. Correspondingly, the server receives the first information and the second information sent by each device in the data distribution system.

In some embodiments, each device in the data distribution system may send the first information and the second information to the server. Correspondingly, the server receives the first information and the second information from each device in the data distribution system, so that the server may generate an acyclic graph of a data distribution path based on the first information and the second information. The first information carries identification information of each device and identification information of an adjacent device connected to each device via a P2P channel, and the second information carries quality of service (QoS) of the P2P channel.

For example, each of the device A201, the device B202, the device C203, the device D204, the device E205, and the device F206 that are in the data distribution system shown in FIG. 2 may send the first information and the second information to the server 207. The first information sent by the device A201 to the server 207 carries identification information of the device A201 and identification information of the device B202 and the device C203 that are connected to the device A201 via P2P channels. The second information sent by the device A201 to the server 207 carries QoS of the P2P channel (that is, a P2P channel A-B) between the device A201 and the device B202 and QoS of the P2P channel (that is, a P2P channel A-C) between the device A201 and the device C203, such as bandwidth, jitter, a delay, and a packet loss rate. Correspondingly, the server 207 receives the first information and the second information from the device A201, the device B202, the device C203, the device D204, the device E205, and the device F206, and generates the acyclic graph of the data distribution path shown in FIG. 3b based on the first information and the second information that are from the device A201, the device B202, the device C203, the device D204, the device E205, and the device F206.

It should be noted that in embodiments of this application, the identification information of the device may be an international mobile equipment identity (IMEI), a subscription permanent identifier (SUPI), a subscription concealed identifier (SUCI) of the device, or other information that can identify the device. This is not specifically limited in this embodiment of this application.

It should be noted that in this embodiment of this application, QoS of a P2P channel between the devices in the data distribution system is not fixed. In order to enable the server to adjust an acyclic graph of a data distribution path in real time based on the QoS of the P2P channel between the devices, for example, to select a P2P channel with higher QoS as the data distribution path when the QoS of the P2P channel between the devices changes, the devices in the data distribution system may periodically send updated second information to the server. Correspondingly, the server may periodically receive the updated second information from the devices in the data distribution system. The server may update the acyclic graph of the data distribution path based on the updated second information sent by the devices in the data distribution system. After the server updates the acyclic graph of the data distribution path based on the updated second information sent by the devices in the data distribution system, in order to enable a device that has sent subscription request information used to request to subscribe to the acyclic graph of the data distribution path or third information to synchronously update the acyclic graph of the data distribution path or the third information, and prevent the device from sending data to an incorrect next-hop device of the device, where the third information is identification information of an adjacent device connected via a P2P channel to the device sending the subscription request information, subscription update information may be sent to the device that has sent the subscription request information. The subscription update information carries an updated acyclic graph of the data distribution path or the third information determined based on the updated acyclic graph of the data distribution path. In this embodiment of this application, the server may generate the acyclic graph of the data distribution path based on the first information and the second information that are sent by the devices in the data distribution system, and periodically update the acyclic graph of the data distribution path based on the periodically sent updated second information. In this way, any device in the data distribution system may determine a next-hop device of the any device based on the acyclic graph of the data distribution path generated by the server, and send, to the next-hop device of the any device, to-be-distributed data that is to be distributed to all devices in the data distribution system. After the server updates the acyclic graph of the data distribution path, a device in the data distribution system may synchronously update the acyclic graph of the data distribution path, to prevent the device from sending data to an incorrect next-hop device of the device.

S302: A source device in the data distribution system sends request information to the server. Correspondingly, the server receives the request information from the source device in the data distribution system, and sends response information to the source device in the data distribution system. The request information is used to request to acquire related information of an adjacent device of the source device, the adjacent device is connected to the source device via a P2P channel, and the response information carries related information determined based on a pre-generated acyclic graph of a data distribution path.

In some embodiments, the source device in the data distribution system may send first query request information to the server. Correspondingly, the server receives the first query request information from the source device in the data distribution system, and sends first query response information to the source device in the data distribution system. The first query request information is used to request to query fourth information, the fourth information is identification information of the adjacent device of the source device, and the first query response information carries the fourth information determined based on the acyclic graph of the data distribution path.

For example, when the device A201 in the data distribution system shown in FIG. 2 is used as the source device, the device A201 may send, to the server 207, the first query request information used to request to query identification information of adjacent devices of the device A201. After receiving the first query request information from the device A201, the server 207 determines, based on a latest generated acyclic graph of the data distribution path, that the adjacent devices of the device A201 are the device B202 and the device C203, and sends the first query response information to the device A201. The first query response information carries the identification information of the device B202 and the identification information of the device C203.

In some other embodiments, the source device in the data distribution system may send first subscription request information to the server. Correspondingly, the server receives the first subscription request information from the source device in the data distribution system, and sends first subscription response information to the source device in the data distribution system. The first subscription request information is used to request to subscribe to the acyclic graph of the data distribution path or the fourth information, the fourth information is the identification information of the adjacent device of the source device, and the first subscription response information carries the acyclic graph of the data distribution path or the fourth information determined based on the acyclic graph of the data distribution path.

For example, when the device A201 in the data distribution system shown in FIG. 2 is used as the source device, the device A201 may send, to the server 207, the first subscription request information used to request to subscribe to the acyclic graph of the data distribution path or the identification information of the adjacent devices of the device A201. After receiving the first subscription request information from the device A201, the server 207 sends the first subscription response information to the device A201, and the first subscription response information carries the latest generated acyclic graph of the data distribution path or the identification information that is of the adjacent device of the device A201 and that is determined based on the latest generated acyclic graph of the data distribution path, for example, the identification information of the device B202 and the identification information of the device C203.

In this embodiment of this application, the source device in the data distribution system may send, to the server, the request information used to request to acquire the related information of the adjacent device of the source device, and receive the response information sent by the server. The response information carries the related information determined based on the pre-generated acyclic graph of the data distribution path, so that the source device may determine a next-hop device of the source device based on the response information, and then the next-hop device performs secondary distribution on the to-be-distributed data that is to be distributed to all devices in the data distribution system, thereby avoiding a problem of network congestion and a waste of network resources caused by repeated transmission of same communication data on a same P2P channel.

S303: The source device determines a first target device set from the adjacent device based on the response information, and sends the first data to a device in the first target device set. The device in the first target device set is the next-hop device of the source device, and the first data carries identification information of the source device.

In some embodiments, the source device may determine the first target device set from the adjacent device based on the response information sent by the server, and send the first data to the device in the first target device set. The response information carries the acyclic graph of the data distribution path or the fourth information determined based on the acyclic graph of the data distribution path, the fourth information is the identification information of the adjacent device of the source device, the device in the first target device set is the next-hop device of the source device, and the first data carries the identification information of the source device.

For example, when the device A201 in the data distribution system shown in FIG. 2 is used as the source device, if the device A201 sends the first query request information to the server 207, the device A201 receives the first query response information sent by the server 207. The first query response information carries the identification information of the device B202 and the identification information of the device C203. If the device A201 sends the first subscription request information to the server 207, the device A201 receives the first subscription response information sent by the server 207. The first subscription response information carries the acyclic graph of the data distribution path or the identification information of the device B202 and the identification information of the device C203. In this case, the device A201 may determine, based on the acyclic graph of the data distribution path or the identification information of the device B202 and the identification information of the device C203, that the adjacent devices are the device B202 and the device C203, and determine, from the adjacent devices, that the next-hop devices are the device B202 and the device C203, that is, determine that the device B202 and the device C203 are the devices in the first target device set corresponding to the device A201, and send, to the device B202 and the device C203, the first data that carries the identification information of the device A201.

It should be noted that in this embodiment of this application, the first data may carry a number identifier, so that the device in the first target device set may determine, based on the number identifier of the first data, whether the first data is repeated data. If the device in the first target device set determines, based on the number identifier of the first data, that the first data is the repeated data, the device in the first target device set discards the first data. The first data may further carry a service identifier, so that when the device in the first target device set determines, based on the number identifier of the first data, that the first data is not the repeated data, the device in the first target device set may determine, based on the service identifier of the first data, whether the first data is the to-be-distributed data. Alternatively, the first data may not carry the service identifier, and the device in the first target device set may determine, based on a service identifier of a P2P channel for transmitting the first data, whether the first data is the to-be-distributed data, where the to-be-distributed data is data that is to be distributed to all devices in the data distribution system.

For example, when the device A201 in the data distribution system shown in FIG. 2 is used as the source device, the first data may be evenly divided into 50 pieces, and each piece of the first data is numbered. Then first data 1, first data 2, . . . , and first data 50 are sequentially sent to the device B202 and the device C203. The device B202 and the device C203 store a number identifier of latest first data sent by the device A201. When new first data is received, a number identifier of the new first data is compared with a previously stored number identifier. If the number identifier of the new first data is less than or equal to the previously stored number identifier, the new first data is determined as the repeated data.

It should be noted that in this embodiment of this application, each device in the data distribution system may locally maintain a socket list of a P2P channel between the device and another device, so that different P2P channels may be distinguished based on packets received on different sockets. In other words, a service identifier of the P2P channel may be a packet received on a socket.

In this embodiment of this application, the source device in the data distribution system may determine the next-hop device of the source device from the adjacent device based on the response information, and send, to the next-hop device of the source device, the first data that carries the number identifier, so that the next-hop device of the source device may determine, based on the number identifier of the first data, whether the first data is the repeated data, and determine, based on the service identifier of the first data or the service identifier of the P2P channel that is for transmitting the first data, whether the first data is the to-be-distributed data. When it is determined that the first data is the repeated data, the first data is discarded, thereby avoiding a waste of network resources caused by secondary distribution of the repeated data. When it is determined that the first data is not the repeated data but is the to-be-distributed data, secondary distribution is performed on the first data, thereby avoiding a problem of network congestion and a waste of network resources caused by repeated transmission of same communication data on a same P2P channel.

S304: When determining the first data as the to-be-distributed data, the device in the first target device set distributes the first data to a device in a second target device set. The device in the second target device set is a next-hop device of the device in the first target device set.

In operation 304, the device in the first target device set may determine the next-hop device of the device in four manners, so that when determining the first data as the to-be-distributed data, the device distributes the first data to the next-hop device of the device. Example embodiments of the four manners are separately described in detail below with reference to specific instances.

Manner 1

In some embodiments, to reduce a quantity of times of transmission of query request information by the device to the server, and reduce a communication delay, the device in the first target device set may periodically send second query request information to the server, and receive second query response information sent by the server. The second query request information is used to request to query fifth information, and the fifth information is identification information of an adjacent device of the device in the first target device set. The second query request information carries identification information of the device in the first target device set, and the second query response information carries the fifth information determined based on the acyclic graph of the data distribution path. After receiving the second query response information from the server, the device in the first target device set may determine the second target device set from the adjacent device of the device in the first target set based on the second query response information, so that when the first data is determined as the to-be-distributed data, the first data that carries the identification information of the source device is distributed to the device in the second target device set. The device in the second target device set is the next-hop device of the device in the first target device set.

For example, when the device B202 in the data distribution system shown in FIG. 2 is used as the device in the first target device set, the device B202 may periodically send the second query request information to the server 207, and receive the second query response information sent by the server 207. The second query request information carries the identification information of the device B202, and the second query response information carries the identification information of the device A201 and identification information of the device E205. The device B202 determines, based on the second query response information, that adjacent devices are the device A201 and the device E205. Because the device A201 in the adjacent devices is a previous-hop device of the device B202, the device E205 in the adjacent devices is determined as a next-hop device of the device B202, that is, the device E205 is determined as the device in the second target device set corresponding to the device B202. The first data that carries the identification information of the device A201 is distributed to the device E205.

It should be noted that in this embodiment of this application, a frequency at which the device in the first target device set sends the second query request information to the server may be automatically adjusted based on whether a network topology of a service frequently changes. For example, the second query request information is sent once every 30 s. This is not specifically limited in this embodiment of this application.

Manner 2

In some embodiments, to reduce the quantity of times of transmission of the query request information by the device to the server, and reduce the communication delay, the device in the first target device set may alternatively send the second query request information to the server when a buffer storing the to-be-distributed data overflows, and receive the second query response information sent by the server. The second query request information is used to request to query the fifth information, and the fifth information is the identification information of the adjacent device of the device in the first target device set. The second query request information carries the identification information of the device in the first target device set, and the second query response information carries the fifth information determined based on the acyclic graph of the data distribution path. After receiving the second query response information from the server, the device in the first target device set may determine the second target device set from the adjacent device of the device in the first target set based on the second query response information, so that when the first data is determined as the to-be-distributed data, the first data that carries the identification information of the source device is distributed to the device in the second target device set. The device in the second target device set is the next-hop device of the device in the first target device set.

For example, when the device B202 in the data distribution system shown in FIG. 2 is used as the device in the first target device set, the device B202 may send the second query request information to the server 207 when the buffer storing the to-be-distributed data overflows. For example, a buffer size may be 256 K. When the to-be-distributed data received by the buffer reaches 256 K, the second query request information is sent once to the server 207, and the second query response information sent by the server 207 is received. The second query request information carries the identification information of the device B202, and the second query response information carries the identification information of the device A201 and the device E205. The device B202 determines, based on the second query response information, that the adjacent devices are the device A201 and the device E205. Because the device A201 in the adjacent devices is a previous-hop device of the device B202, the device E205 in the adjacent devices is determined as a next-hop device of the device B202, that is, the device E205 is determined as the device in the second target device set corresponding to the device B202. The to-be-distributed data in the buffer is distributed to the device E205.

It should be noted that in this embodiment of this application, the buffer size may be automatically set based on sensitivity of a service to a delay. For a service that is sensitive to the delay, the buffer may be set to be smaller, so that the to-be-distributed data in the buffer can be distributed in time. Otherwise, the buffer may be set to be larger, to reduce a quantity of times of query. This is not specifically limited in this embodiment of this application.

In this embodiment of this application, the device in the first target device set may send the second query request information to the server periodically or when the buffer storing the to-be-distributed data overflows, to reduce the quantity of times of transmission of the query request information by the device to the server, and reduce the communication delay. After sending the second query request information to the server, the device receives the second query response information sent by the server, and determines the next-hop device of the device from the adjacent device based on the second query response information, so that the device may send the first data to the next-hop device of the device when determining the first data as the to-be-distributed data, to implement secondary distribution of the data, and avoid a problem of network congestion and a waste of network resources caused by repeated transmission of same communication data on a same P2P channel.

Manner 3

In some embodiments, when determining that there is no acyclic graph of the data distribution path or fifth information locally, the device in the first target device set may send the second subscription request information to the server, and receive the second subscription response information sent by the server. The fifth information is the identification information of the adjacent device of the device in the first target device set, and the second subscription request information is used to request to subscribe to the acyclic graph of the data distribution path or the fifth information determined based on the acyclic graph of the data distribution path. The second subscription request information carries the identification information of the device, and the second subscription response information carries the acyclic graph of the data distribution path or the fifth information determined based on the acyclic graph of the data distribution path. When determining that there is no acyclic graph of the data distribution path or fifth information locally, the device in the first target device set may determine the second target device set from the adjacent devices of the device in the first target set based on the second subscription response information from the server, and distribute the first data that carries the identification information of the source device to the device in the second target device set. The device in the second target device set is the next-hop device of the device in the first target device set.

For example, when the device B202 in the data distribution system shown in FIG. 2 is used as the device in the first target device set, and when determining that there is no acyclic graph of the data distribution path or fifth information locally, the device B202 may send the second subscription request information to the server 207, and receive the second subscription response information sent by the server 207. The second subscription request information carries the identification information of the device B202, and the second subscription response information carries the acyclic graph of the data distribution path or the identification information of the device A201 and the device E205. The device B202 determines, based on the second query response information, that the adjacent devices are the device A201 and the device E205, determines, from the adjacent devices, that a previous-hop device is the device A201 and a next-hop device is the device E205, that is, determines that the device E205 is the device in the second target device set corresponding to the device B202, and distributes the first data that carries the identification information of the device A201 to the device E205.

It should be noted that in this embodiment of this application, after sending the second subscription request information to the server, the device in the first target device set may receive subscription update information sent by the server, where the subscription update information carries an updated acyclic graph of the data distribution path or the fifth information determined based on the updated acyclic graph of the data distribution path, so that the device in the first target device set may update the local acyclic graph of the data distribution path or fifth information based on the subscription update information.

In some other embodiments, when determining that there is the acyclic graph of the data distribution path or the fifth information locally, the device in the first target device set may directly determine the second target device set from the adjacent devices of the device in the first target set based on the acyclic graph of the data distribution path or the fifth information, and distribute the first data that carries the identification information of the device A201 to the device in the second target device set.

In this embodiment of this application, when determining that there is no acyclic graph of the data distribution path or fifth information locally, the device in the first target device set sends the second subscription request information to the server, receives the second subscription response information sent by the server, and determines the next-hop device of the device from the adjacent devices based on the second subscription response information, so that the device may send the first data to the next-hop device of the device when determining the first data as the to-be-distributed data, to implement secondary distribution of the data, and avoid a problem of network congestion and a waste of network resources caused by repeated transmission of same communication data on a same P2P channel.

Manner 4

In some embodiments, after sending, to the server, the first subscription request information used to request to subscribe to the acyclic graph of the data distribution path, and receiving the first subscription response information that is sent by the server and that carries the acyclic graph of the data distribution path, the source device may add the acyclic graph of the data distribution path to the first data and send the first data to the device in the first target device set, so that when determining that the first data carries the acyclic graph of the data distribution path, the device in the first target device set may directly determine the second target device set from the adjacent device of the device in the first target set based on the acyclic graph of the data distribution path, and distribute, to the device in the second target device set, the first data that carries the identification information of the source device. The device in the second target device set is the next-hop device of the device in the first target device set.

For example, when the device B202 in the data distribution system shown in FIG. 2 is used as the device in the first target device set, and when determining that the first data carries the acyclic graph of the data distribution path, the device B202 may directly determine, based on the acyclic graph of the data distribution path, that the adjacent devices are the device A201 and the device E205, determine, from the adjacent devices, that the previous-hop device is the device A201 and the next-hop device is the device E205, that is, determine that the device E205 is the device in the second target device set corresponding to the device B202, and distribute the first data that carries the identification information of the device A201 to the device E205.

It should be noted that in this embodiment of this application, the acyclic graph of the data distribution path may be stored in a manner such as an adjacency matrix or an adjacency list. This is not specifically limited in this embodiment of this application.

It should be noted that in this embodiment of this application, after sending the first subscription request information to the server, the source device may receive subscription update information sent by the server, where the subscription update information carries the updated acyclic graph of the data distribution path, so that the source device may add the updated acyclic graph of the data distribution path to the first data and send the first data to the device in the first target device set.

For example, when the device A201 in the data distribution system shown in FIG. 2 is used as the source device, the first data may be evenly divided into 50 pieces, and each piece of the first data is numbered. Then first data 1, first data 2, . . . , and first data 50 are sequentially sent to the device B202 and the device C203. The first data 1 and the first data 2 carry a first acyclic graph of a data distribution path, and the first data 3, . . . , and the first data 50 carry a second acyclic graph of a data distribution path. The second acyclic graph of the data distribution path is an updated first acyclic graph of the data distribution path. In this embodiment of this application, after sending, to the server, the first subscription request information used to request to subscribe to the acyclic graph of the data distribution path, and receiving the first subscription response information that is sent by the server and that carries the acyclic graph of the data distribution path, the source device may add the acyclic graph of the data distribution path to the first data and send the first data to the device in the first target device set, so that when determining that the first data carries the acyclic graph of the data distribution path, the device in the first target device set directly determines the next-hop device of the device from the adjacent devices based on the acyclic graph of the data distribution path, and when determining the first data as the to-be-distributed data, the device may send the first data to the next-hop device of the device, to implement secondary distribution of the data, and avoid a problem of network congestion and a waste of network resources caused by repeated transmission of same communication data on a same P2P channel.

The method provided in embodiments of this application is described above in detail with reference to FIG. 3a and FIG. 3b. A data distribution system provided in embodiments of this application is described below in detail with reference to FIG. 4 and FIG. 5.

Based on a concept the same as that of the foregoing method embodiments, an embodiment of this application further provides a data distribution system 400. The data distribution system 400 includes devices and a server that are configured to perform the method shown in FIG. 3a and FIG. 3b. For example, refer to FIG. 4. The apparatus 400 may include at least three devices 401 and a server 402, and the at least three devices 401 are connected to each other via P2P channels.

Any one of the at least three devices 401 is configured to: send request information to the server 402, and receive response information sent by the server 402, where the request information is used to request to acquire related information of an adjacent device of the any device 401, the adjacent device is connected to the any device 401 via a P2P channel, and the response information carries the related information determined based on a pre-generated acyclic graph of a data distribution path; and the any device 401 is further configured to: determine a first target device set from the adjacent device based on the response information, and send first data to a device in the first target device set, where the first data carries identification information of the any device 401, the identification information is used to indicate the device in the first target device set to distribute the first data to a device in a second target device set when determining the first data as to-be-distributed data, the device in the first target device set is a next-hop device of the any device 401, the device in the second target device set is a next-hop device of the device in the first target device set, and the to-be-distributed data is data that is to be distributed to all devices in the data distribution system.

In a possible design, before the sending request information to the server 402, the server 402 is configured to:

receive first information and second information that are sent by each of the at least three devices 401, and generate the acyclic graph of the data distribution path based on the first information and the second information, where the first information carries identification information of each device and identification information of an adjacent device connected to each device via the P2P channel, and the second information carries quality of service QoS of the P2P channel.

In a possible design, the server 402 is further configured to:

receive updated second information periodically sent by each of the at least three devices, and update the acyclic graph of the data distribution path based on the updated second information.

In a possible design, the server 402 is further configured to:

after updating the acyclic graph of the data distribution path, send subscription update information to a device that is of the at least three devices 401 and that has sent subscription request information, where the subscription request information is used to request to subscribe to the acyclic graph of the data distribution path or third information, the third information is identification information of an adjacent device of the device sending the subscription request information, and the subscription update information carries an updated acyclic graph of the data distribution path or the third information determined based on an updated acyclic graph of the data distribution path.

In a possible design, when sending the request information to the server 402, and receiving the response information sent by the server 402, the any device 401 is configured to:

send first query request information to the server 402, and receive first query response information sent by the server 402, where the first query request information is used to request to query fourth information, the fourth information is identification information of the adjacent device of the any device 401, and the first query response information carries the fourth information determined based on the acyclic graph of the data distribution path; or send first subscription request information to the server 402, and receive first subscription response information sent by the server 402, where the first subscription request information is used to request to subscribe to the acyclic graph of the data distribution path or the fourth information, and the first subscription response information carries the acyclic graph of the data distribution path or the fourth information determined based on the acyclic graph of the data distribution path.

In a possible design, the any device 401 is further configured to:

when receiving the first data, determine, based on a number identifier of the first data, whether the first data is repeated data; and if the first data is the repeated data, discard the first data; or if the first data is not the repeated data, determine whether the first data is the to-be-distributed data.

In a possible design, when determining whether the first data is the to-be-distributed data, the any device 401 is configured to:

determine, based on a service identifier of a P2P channel for transmitting the first data or a service identifier of the first data, whether the first data is the to-be-distributed data.

In a possible design, when distributing the first data to the device in the second target device set, the any device 401 is configured to:

send second query request information to the server 402 periodically or when a buffer storing the to-be-distributed data overflows, where the second query request information is used to request to query fifth information, and the fifth information is identification information of an adjacent device of the device in the first target device set;

receive second query response information sent by the server 402, where the second query response information carries the fifth information determined based on the acyclic graph of the data distribution path; and determine the second target device set based on the second query response information, and distribute the first data to the device in the second target device set.

In a possible design, when distributing the first data to the device in the second target device set, the any device 401 is configured to:

when determining that there is no acyclic graph of the data distribution path or fifth information, send second subscription request information to the server 402, and receive second subscription response information sent by the server 402, where the fifth information is the identification information of the adjacent device of the device in the first target device set, the second subscription request information is used to request to subscribe to the acyclic graph of the data distribution path or the fifth information determined based on the acyclic graph of the data distribution path, and the second subscription response information carries the acyclic graph of the data distribution path or the fifth information determined based on the acyclic graph of the data distribution path; and determine the second target device set based on the acyclic graph of the data distribution path, and distribute the first data to the device in the second target device set.

In a possible design, when distributing the first data to the device in the second target device set, the any device 401 is configured to:

when determining that the first data carries the acyclic graph of the data distribution path, determine the second target device set based on the acyclic graph of the data distribution path, and distribute the first data to the device in the second target device set.

Figure 5:
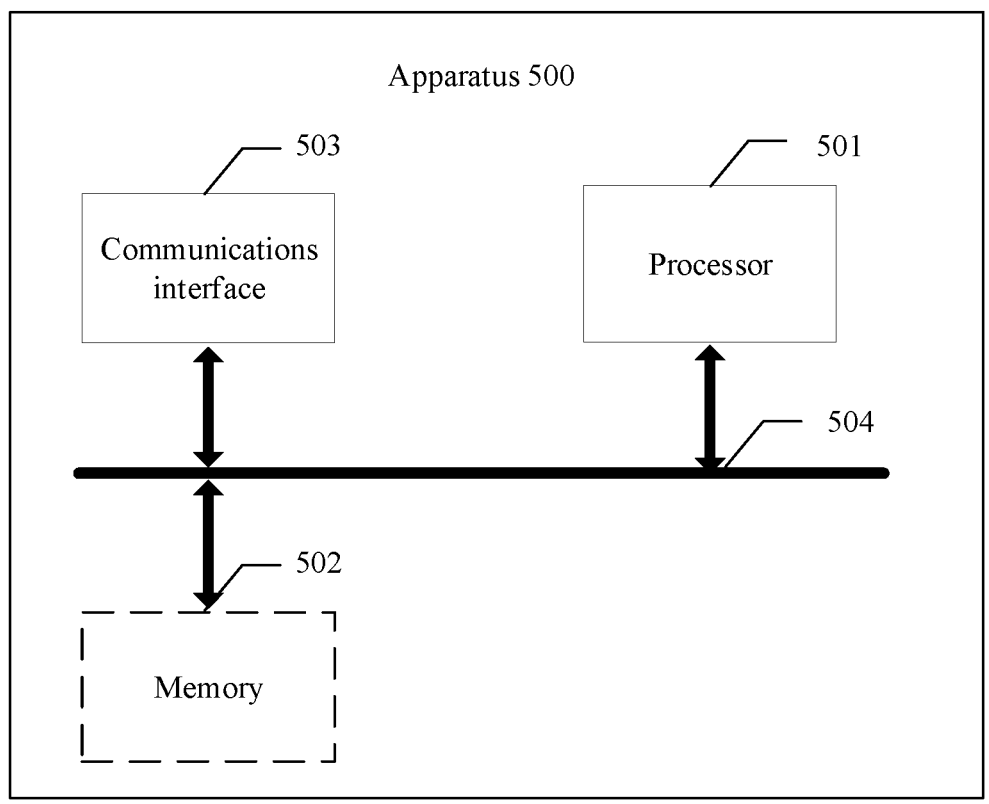
FIG. 5 is a schematic diagram of a structure of a P2P-based data distribution apparatus to which an embodiment of this application is applicable.

Based on a concept the same as that of the foregoing method embodiments, refer to FIG. 5. An embodiment of this application further provides a P2P-based data distribution apparatus 500. The apparatus 500 may be a data distribution system that includes at least three devices and a server, or the apparatus 500 in the data distribution system. For example, refer to FIG. 5. The apparatus 500 may include:

at least one processor 501 and a communications interface 503 communicatively connected to the at least one processor 501.

Figure 3B:
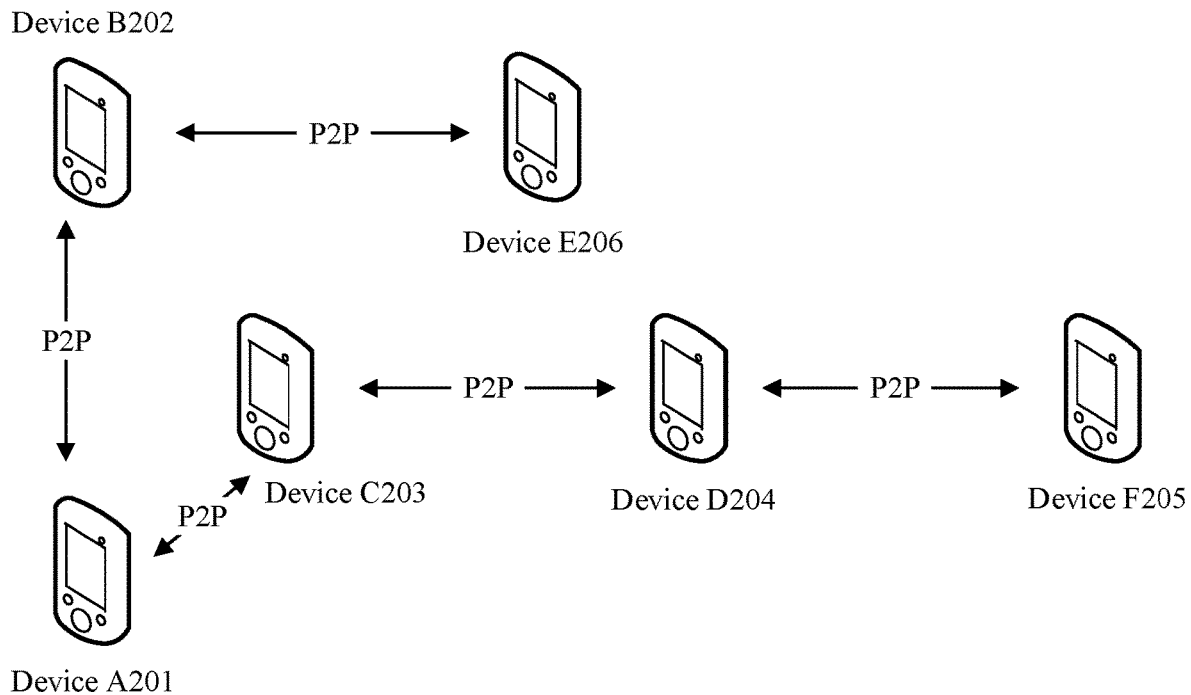
FIG. 3b is a schematic diagram of an acyclic data distribution path to which an embodiment of this application is applicable.
Figure 4:
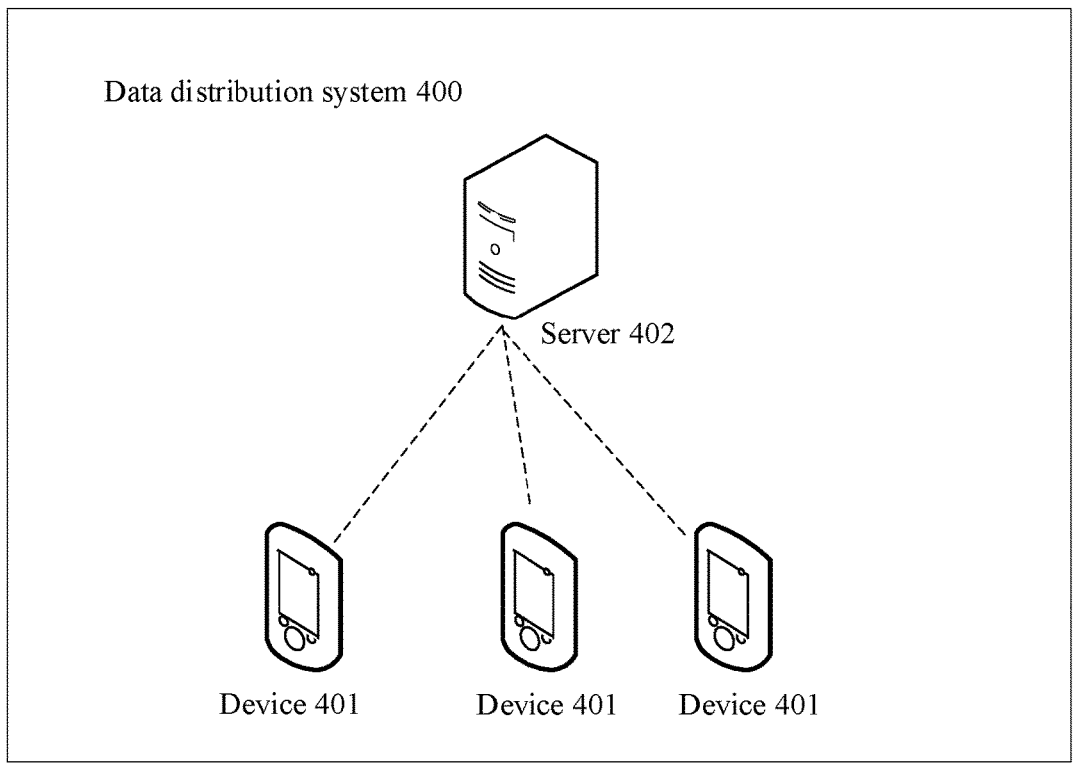
FIG. 4 is a schematic diagram of a structure of a data distribution system to which an embodiment of this application is applicable.

The at least one processor 501 executes instructions stored in a memory 502, so that the apparatus 500 performs the methods shown in FIG. 3a and FIG. 3b.

In some embodiments, the memory 502 is located outside the apparatus 500.

In some embodiments, the apparatus 500 includes the memory 502, the memory 502 is connected to the at least one processor 501, and the memory 502 stores the instructions that can be executed by the at least one processor 501. In FIG. 5, a dashed line is used to represent that the memory 502 is optional for the apparatus 500.

The processor 501 and the memory 502 may be coupled through an interface circuit, or may be integrated together. This is not limited herein.

In this embodiment of this application, a specific connection medium among the processor 501, the memory 502, and the communications interface 503 is not limited. In this embodiment of this application, in FIG. 5, the processor 501, the memory 502, and the communications interface 503 are connected to each other through a bus 504. The bus is represented by a bold line in FIG. 5. A connection manner between other components is merely an example for description, and is not limited thereto. The bus may be classified into an address bus, a data bus, a control bus, and the like. For ease of representation, only one bold line is used to represent the bus in FIG. 5, but this is not indicated that there is only one bus or only one type of bus.

Based on a concept the same as that of the foregoing method embodiments, an embodiment of this application further provides a computer-readable storage medium, where the computer-readable storage medium stores a computer program. When the computer program is run on a computer, the computer is enabled to perform any one of the foregoing P2P-based data distribution method embodiments and possible implementations of the method embodiments, for example, perform any operation of the P2P-based data distribution method embodiments in FIG. 3a and FIG. 3b, and/or perform another process of the technology described in this specification.

Based on a concept the same as that of the foregoing method embodiments, an embodiment of this application further provides a program product. When the program product runs on a computer, the computer is enabled to perform any one of the foregoing P2P-based data distribution method embodiments and possible implementations of the method embodiments, for example, perform any operation of the P2P-based data distribution method embodiments in FIG. 3a and FIG. 3b, and/or perform another process of the technology described in this specification.

Based on a concept the same as that of the foregoing method embodiments, an embodiment of this application further provides a chip. The chip may be coupled to a memory in a first core network device or in a base station, and is configured to invoke a computer program stored in the memory and perform any one of the foregoing P2P-based data distribution method embodiments and possible implementations of the method embodiments, for example, perform any operation of the P2P-based data distribution method embodiments in FIG. 3a and FIG. 3b, and/or perform another process of the technology described in this specification.

It should be understood that a processor or a processing unit (the processor or the processing unit shown in FIG. 5) in embodiments of this application may be an integrated circuit chip that has a signal processing capability. During implementation, the operations of the foregoing P2P-based data distribution method embodiment may be implemented by a hardware integrated logic circuit in the processor, or instructions in a form of software. The processor may be a general-purpose central processing unit (CPU), a general-purpose processor, digital signal processing (DSP), an application-specific integrated circuit (ASIC), a field-programmable gate array (FPGA) or another programmable logic device, a transistor logic device, a hardware component, or any combination thereof, or may be a combination implementing a computing function, for example, a combination of one or more microprocessors or a combination of a DSP and a microprocessor. The general-purpose processor may be a microprocessor, or the processor may be any conventional processor or the like.

It should be understood that a memory or a storage unit in embodiments of this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory in the system and method described in this application is intended to include but is not limited to these memories and any other memories of a proper type.

Various illustrative logic units and circuits described in embodiments of this application may implement or operate the described functions by using a general-purpose processor, a digital signal processor, an application-specific integrated circuit (ASIC), a field-programmable gate array (FPGA) or another programmable logic apparatus, a discrete gate or transistor logic, a discrete hardware component, or any combination thereof. The general-purpose processor may be a microprocessor. In some embodiments, the general-purpose processor may alternatively be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Operations of the methods or algorithms described in embodiments of this application may be directly embedded into hardware, a software unit executed by a processor, or a combination thereof. The software unit may be stored in a RAM, a flash memory, a ROM, an EPROM, an EEPROM, a register, a hard disk, a removable disk, a CD-ROM, or any other storage medium in the art. For example, the storage medium may connect to a processor so that the processor may read information from the storage medium and write information to the storage medium. In some embodiments, the storage medium may be integrated into the processor. The processor and the storage medium may be disposed in an ASIC, and the ASIC may be disposed in a communications device (for example, a first core network device or a base station), for example, may be disposed in different components of the communications device.

All or some of the foregoing embodiments may be implemented by software, hardware, firmware, or any combination thereof. When software is used to implement the embodiments, all or some of the embodiments may be implemented in a form of a computer program product. The computer program product includes one or more computer programs or instructions. When the computer programs or the instructions are loaded and executed on a computer, all or some of the procedures or functions in the embodiments of this application are executed. The computer may be a general-purpose computer, a dedicated computer, a computer network, or another programmable apparatus. The computer programs or the instructions may be stored in a computer-readable storage medium, or may be transmitted through the computer-readable storage medium. The computer-readable storage medium may be any usable medium accessible by the computer, or a data storage device such as a server integrating one or more usable media. The usable medium may be a magnetic medium, for example, a floppy disk, a hard disk, or a magnetic tape; or may be an optical medium, for example, a DVD; or may be a semiconductor medium, for example, a solid-state drive (SSD).

The embodiments of this application are described with reference to the flowcharts and/or block diagrams of the methods, the apparatuses, and the computer program products according to the embodiments. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or the processor of the another programmable data processing device generate an apparatus for implementing a function in one or more procedures in the flowcharts and/or in one or more blocks in the block diagrams.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a function in one or more procedures in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide operations for implementing a function in one or more procedures in the flowcharts and/or in one or more blocks in the block diagrams.

What is claimed is:

1. A method, applied to a data distribution system, wherein the data distribution system comprises at least three devices and a server, and the method comprises:
   sending, by a first device of the at least three devices, request information to the server, and receiving response information sent by the server, wherein the request information is used to request to acquire related information of a second device that is connected to the first device via a peer-to-peer (P2P) channel, and the response information carries the related information determined based on a pre-generated acyclic graph of a data distribution path; and
   determining, by the first device, a first target device set from the second device based on the response information, and sending first data to a device in the first target device set, wherein the first data carries identification information of the first device, the identification information is used to indicate the device in the first target device set to distribute the first data to a device in a second target device set when determining the first data as to-be-distributed data, the device in the first target device set is a next-hop device of the first device, the device in the second target device set is a next-hop device of the device in the first target device set, and the to-be-distributed data is data that is to be distributed to all devices in the data distribution system.

2. The method according to claim 1, wherein before the sending the request information to the server, the method further comprises:
   sending, by each of the at least three devices, first information and second information to the server, wherein the first information and the second information are used to indicate the server to generate the acyclic graph of the data distribution path, the first information carries the identification information of the first device and identification information of the second device connected to the first device via the P2P channel, and the second information carries quality of service (QOS) of the P2P channel.

3. The method according to claim 2, wherein the method further comprises:
   periodically sending, by each of the at least three devices, updated second information to the server, wherein the updated second information is used to indicate the server to update the acyclic graph of the data distribution path.

4. The method according to claim 3, wherein the method further comprises:
   sending, by any one of the at least three devices, subscription request information to the server, and receiving subscription update information sent by the server after the acyclic graph of the data distribution path is updated, wherein the subscription request information is used to request to subscribe to the acyclic graph of the data distribution path or third information, the third information is identification information of an adjacent device of the device sending the subscription request information, and the subscription update information carries an updated acyclic graph of the data distribution path or the third information determined based on an updated acyclic graph of the data distribution path.

5. The method according to claim 4, wherein the sending the request information to the server, and the receiving the response information sent by the server comprises:

sending first query request information to the server, and receiving first query response information sent by the server, wherein the first query request information is used to request to query fourth information, the fourth information is identification information of the second device, and the first query response information carries the fourth information determined based on the acyclic graph of the data distribution path; or sending first subscription request information to the server, and receiving first subscription response information sent by the server, wherein the first subscription request information is used to request to subscribe to the acyclic graph of the data distribution path or fourth information, and the first subscription response information carries the acyclic graph of the data distribution path or the fourth information determined based on the acyclic graph of the data distribution path.

6. The method according to claim 1, wherein the method further comprises:

when receiving the first data, determining, by any one of the at least three devices based on a number identifier of the first data, whether the first data is repeated data; and in response to determining that the first data is the repeated data, discarding the first data; or in response to determining that the first data is not the repeated data, determining whether the first data is the to-be-distributed data.

7. The method according to claim 6, wherein the determining whether the first data is the to-be-distributed data comprises:

determining, based on a service identifier of a P2P channel for transmitting the first data or a service identifier of the first data, whether the first data is the to-be-distributed data.

8. The method according to claim 7, wherein the distributing the first data to the device in the second target device set comprises:

sending second query request information to the server periodically or when a buffer storing the to-be-distributed data overflows, wherein the second query request information is used to request to query fifth information, and the fifth information is the identification information of the second device;

receiving second query response information sent by the server, wherein the second query response information carries the fifth information determined based on the acyclic graph of the data distribution path; and determining, by the device in the first target device set, the second target device set based on the second query response information, and distributing the first data to the device in the second target device set.

9. The method according to claim 7, wherein the distributing the first data to the device in the second target device set comprises:

when it is determined that the first data carries the acyclic graph of the data distribution path, determining the second target device set based on the acyclic graph of the data distribution path, and distributing the first data to the device in the second target device set.

10. The method according to claim 8, wherein the distributing the first data to the device in the second target device set further comprises:

when it is determined that there is no acyclic graph of the data distribution path or fifth information, sending second subscription request information to the server, and receiving second subscription response information sent by the server, wherein the fifth information is the identification information of the second device, the second subscription request information is used to request to subscribe to the acyclic graph of the data distribution path or the fifth information determined based on the acyclic graph of the data distribution path, and the second subscription response information carries the acyclic graph of the data distribution path or the fifth information determined based on the acyclic graph of the data distribution path; and determining the second target device set based on the second subscription response information, and distributing the first data to the device in the second target device set.

11. A method, applied to a data distribution system, wherein the data distribution system comprises at least three devices and a server, and the method comprises:

receiving, by the server, request information sent by a first device of the at least three devices, wherein the request information is used to request to acquire related information of a second device that is connected to the first device via a peer-to-peer (P2P) channel; and sending, by the server, response information to the first device, wherein the response information is used to indicate the first device to determine a first target device set from the second device and send first data to a device in the first target device set, the response information carries the related information determined based on a pre-generated acyclic graph of a data distribution path, the device in the first target device set is a next-hop device of the first device, and the first data carries identification information of the first device.

12. The method according to claim 11, wherein before the receiving, by the server, the request information sent by the first device of the at least three devices, the method further comprises:

receiving, by the server, first information and second information that are sent by each of the at least three devices, and generating the acyclic graph of the data distribution path based on the first information and the second information, wherein the first information carries identification information of the first device and identification information of the second device connected to the first device via the P2P channel, and the second information carries quality of service (QoS) of the P2P channel.

13. The method according to claim 12, wherein the method further comprises:

receiving, by the server, updated second information periodically sent by each of the at least three devices, and updating the acyclic graph of the data distribution path based on the updated second information.

14. The method according to claim 13, wherein the method further comprises:

after updating the acyclic graph of the data distribution path, sending, by the server, subscription update information to a device that is of the at least three devices and that has sent subscription request information, wherein the subscription request information is used to request to subscribe to the acyclic graph of the data distribution path or third information, the third information is identification information of an adjacent device of the device sending the subscription request information, and the subscription update information carries an updated acyclic graph of the data distribution path or the third information determined based on an updated acyclic graph of the data distribution path.

15. The method according to claim 14, wherein the sending, by the server, the response information to the first device comprises:
receiving, by the server, query request information sent by the first device, and sending query response information to the first device, wherein the query request information is used to request to query fourth information, the fourth information is identification information of the second device, and the query response information carries the fourth information determined based on the acyclic graph of the data distribution path; or
receiving, by the server, subscription request information sent by the first device, and sending subscription response information to the first device, wherein the subscription request information is used to request to subscribe to the acyclic graph of the data distribution path or fourth information, and the subscription response information carries the acyclic graph of the data distribution path or the fourth information determined based on the acyclic graph of the data distribution path.

16. An apparatus, applied to a data distribution system, wherein the data distribution system comprises:
at least three devices and a server, and the apparatus comprises at least one processor and a memory;
the memory stores one or more computer programs; and
when the one or more computer programs stored in the memory are executed by the at least one processor, the apparatus is enabled to perform operations comprising:
sending, by a first device of the at least three devices, request information to the server, and receiving response information sent by the server, wherein the request information is used to request to acquire related information of a second device that is connected to the first device via a peer-to-peer (P2P) channel, and the response information carries the related information determined based on a pre-generated acyclic graph of a data distribution path; and
determining, by the first device, a first target device set from the second device based on the response information, and sending first data to a device in the first target device set, wherein the first data carries identification information of the first device, the identification information is used to indicate the device in the first target device set to distribute the first data to a device in a second target device set when determining the first data as to-be-distributed data, the device in the first target device set is a next-hop device of the first device, the device in the second target device set is a next-hop device of the device in the first target device set, and the to-be-distributed data is data that is to be distributed to all devices in the data distribution system.

17. The apparatus according to claim 16, wherein before the sending the request information to the server, the operations further comprise:
sending, by each of the at least three devices, first information and second information to the server, wherein the first information and the second information are used to indicate the server to generate the acyclic graph of the data distribution path, the first information carries the identification information of the first device and identification information of the second device connected to the first device via the P2P channel, and the second information carries quality of service (QOS) of the P2P channel.

18. The apparatus according to claim 17, wherein the operations further comprise:
periodically sending, by each of the at least three devices, updated second information to the server, wherein the updated second information is used to indicate the server to update the acyclic graph of the data distribution path.

19. The apparatus according to claim 18, wherein the operations further comprise:
sending, by any one of the at least three devices, subscription request information to the server, and receiving subscription update information sent by the server after the acyclic graph of the data distribution path is updated, wherein the subscription request information is used to request to subscribe to the acyclic graph of the data distribution path or third information, the third information is identification information of an adjacent device of the device sending the subscription request information, and the subscription update information carries an updated acyclic graph of the data distribution path or the third information determined based on an updated acyclic graph of the data distribution path.

20. The apparatus according to claim 19, wherein the sending the request information to the server, and the receiving the response information sent by the server comprises:
sending first query request information to the server, and receiving first query response information sent by the server, wherein the first query request information is used to request to query fourth information, the fourth information is identification information of the second device, and the first query response information carries the fourth information determined based on the acyclic graph of the data distribution path; or
sending first subscription request information to the server, and receiving first subscription response information sent by the server, wherein the first subscription request information is used to request to subscribe to the acyclic graph of the data distribution path or fourth information, and the first subscription response information carries the acyclic graph of the data distribution path or the fourth information determined based on the acyclic graph of the data distribution path.

* * * * *